United States Patent

[11] 3,539,196

| [72] | Inventor | David R. Fleming |
| | | Mountain View, California |
| [21] | Appl. No. | 763,637 |
| [22] | Filed | Sept. 30, 1968 |
| [45] | Patented | Nov. 10, 1970 |
| [73] | Assignee | Lockheed Aircraft Corporation |
| | | Burbank, California |

[54] VEHICLE STEERING ASSEMBLY
9 Claims, 4 Drawing Figs.

[52] U.S. Cl. .................................................. 280/92, 280/62
[51] Int. Cl. .................................................. B62d 7/06
[50] Field of Search .......................................... 280/87, 92, 93, 47.11, 62, 270; 180/25, 26, 27

[56] References Cited
UNITED STATES PATENTS

| 388,043 | 8/1888 | House | 280/270(X)UX |
| 1,424,822 | 8/1922 | Herds | 280/92 |
| 2,510,798 | 6/1950 | Cahill | 280/92(X)UX |

Primary Examiner—Leo Friaglia
Assistant Examiner—Leslie J. Paperner
Attorneys—George C. Sullivan and Rodger N. Alleman ABSTRACT: A three wheel vehicle includes a steering assembly having a pair of spaced-apart struts mounted on pivotal bearings. A steerable wheel and axle is pivotally connected to and positioned between the ends of the struts. The vehicle is steered by pivoting the struts whereby the wheel and axle is simultaneously turned and translated laterally with respect to the vehicle.

Patented Nov. 10, 1970
3,539,196
Sheet 1 of 3
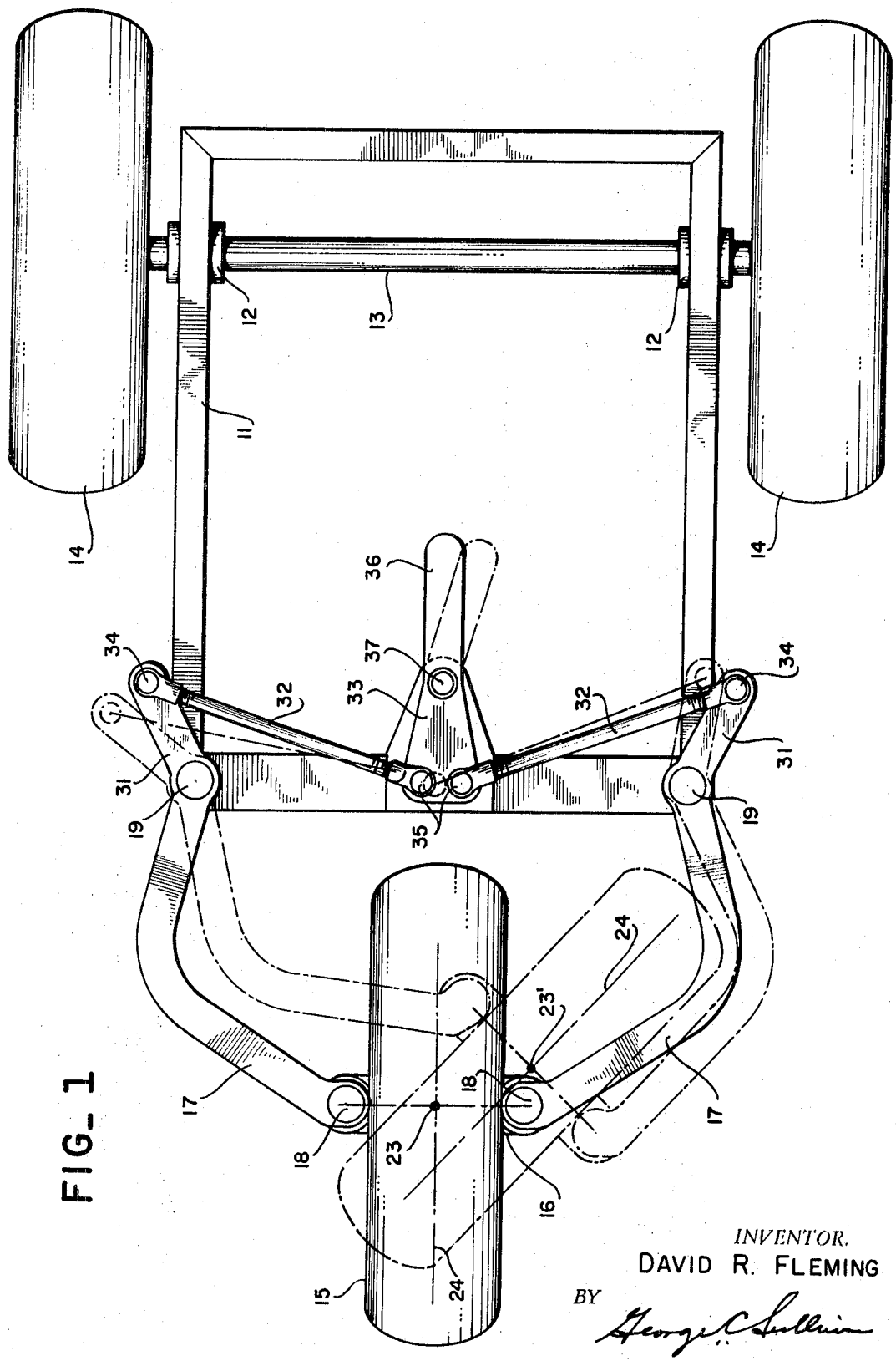
FIG_1
INVENTOR.
DAVID R. FLEMING
BY
*George C. Sullivan*
Agent

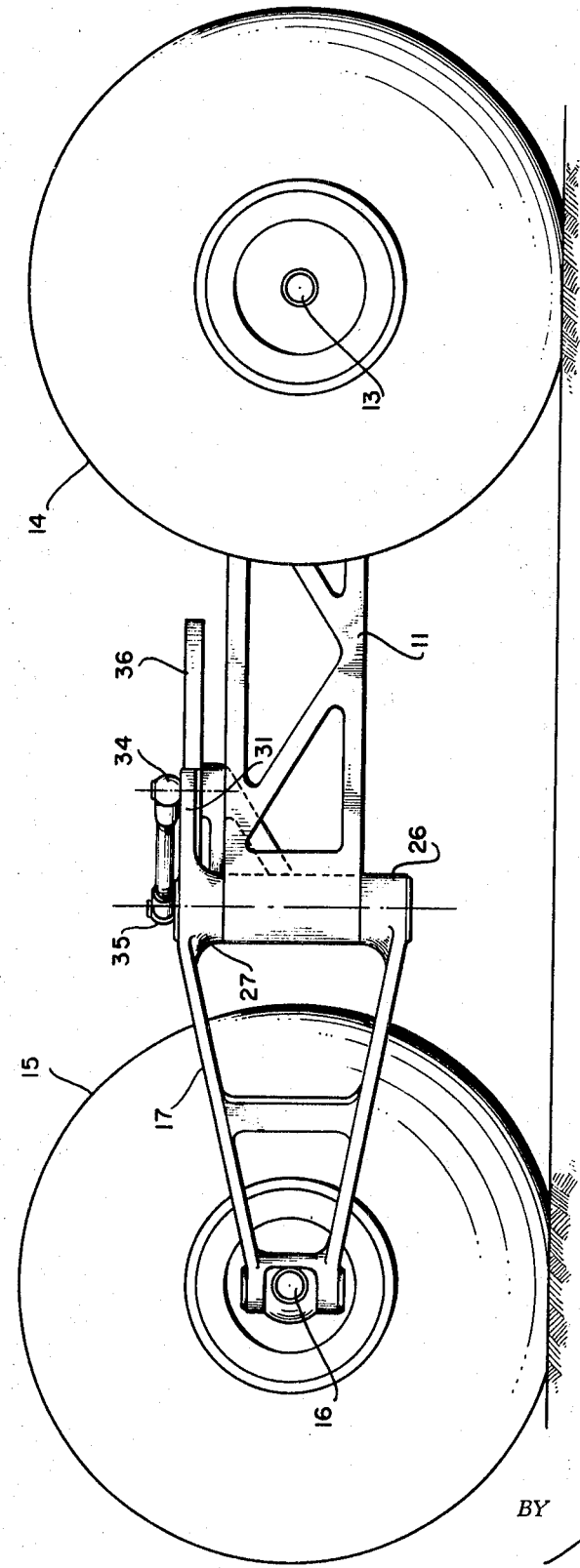

Patented Nov. 10, 1970
3,539,196
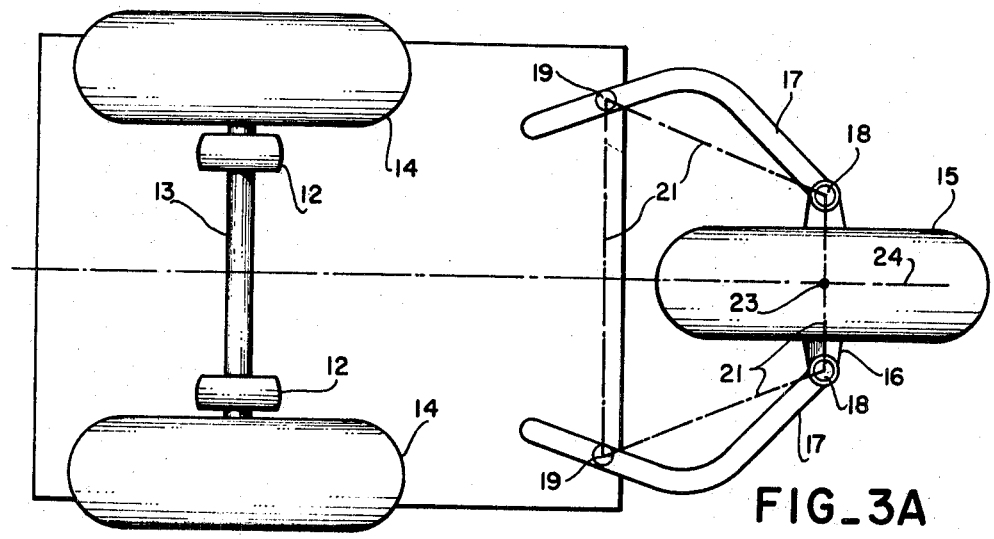
FIG_3A
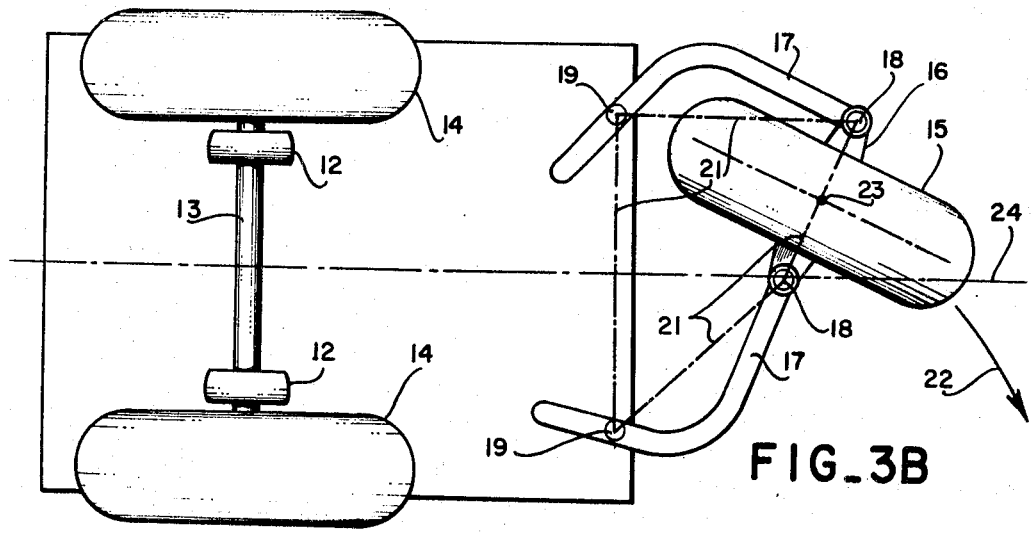
FIG_3B
*INVENTOR.*
DAVID R. FLEMING
BY George C. Sullivan
Agent

VEHICLE STEERING ASSEMBLY

BACKGROUND OF THE INVENTION

This invention relates to wheeled vehicles, and more particularly to an arrangement for steering a vehicle such that a steerable wheel is simultaneously turned and laterally translated to increase the stability of the vehicle while turning.

Heretofore, vehicles have been steered by controlled turning of one or more steerable wheels. Steerable wheels for bicycles, tricycles and the like have been mounted in forks which may be turned in supporting bearings or pivot points positioned essentially over the wheels. Steerable wheels for automobiles and similar vehicles are mounted on axle assemblies such that the wheel can turn or pivot about a king pin or a ball and socket joint positioned near the center or hub of the wheel. Wagon-type vehicles have steering assemblies wherein two wheels are mounted at the ends of a single-axle structure, and the vehicle is steered by turning the axle structure such that both wheels pivot about a single centrally positioned vertical axis. In each of these vehicle steering arrangements, a steerable wheel turns or pivots about a substantially vertical axis which has a fixed position in relation to the vehicle.

For purposes of this patent, the terms "turn" or "turning" will refer to the pivoting of a wheel about an axis which is substantially vertical for the purpose of steering a vehicle; and the terms "rotate" or "rotating" will refer to a spinning of a wheel on its axle about the axis of rotation which is normally horizontal. Thus a steerable wheel is "rotatable" on its axle, and the wheel and axle may also be "turned" by a steering assembly. These two rotary movements associated with a steerable wheel of a vehicle will therefore be distinguished from each other by the use of the distinctive terms of "rotating" vs. "turning".

SUMMARY OF THE INVENTION

According to this invention, a three-wheel vehicle is stabilized while turning by a lateral translation of a steerable wheel as the wheel is turned. The steerable wheel is translated toward the outside of the vehicle's turning circle to counteract the centrifugal force which will tend to sway and tip the vehicle during the turn. A simultaneous turning and lateral translation of the steerable wheel is accomplished by rotatably mounting the steerable wheel on an axle which is pivotally connected to the ends of a pair of spaced-apart arms or struts which may pivot from fixed points laterally spaced apart on the vehicle.

DESCRIPTION OF THE DRAWINGS

Various features and advantages of this invention will become apparent upon consideration of the following description taken in connection with the accompanying drawings which show a preferred embodiment of this invention. The views of the drawing are as follows:

FIG. 1 is a top or plan view of the vehicle chassis and steering assembly constructed in accordance with this invention;

FIG. 2 is a side view of the vehicle chassis and steering assembly;

FIG. 3A is a bottom view of a vehicle with the steering assembly in a neutral or "straight ahead" position; and FIG. 3B is a similar bottom view of a vehicle with the steering assembly in an extreme "left turn" position.

DESCRIPTION OF THE PREFERRED EMBODIMENT

Referring to FIG. 1, a three-wheel vehicle may comprise a frame 11 having axle support 12 which may be rigid or which may include a spring suspension or other shock absorbing devices. An axle 13 may be held in a relatively fixed position on the vehicle, and a pair of nonsteerable wheels 14 are rotatably mounted thereon. As in other three-wheel vehicles, the pair of nonsteerable wheels 14 are on a fixed axle near one end of the vehicle, and a steerable wheel 15 is mounted near the other end.

The steerable wheel 15 is mounted to rotate on an axle member 16 which is connected to the ends of a pair of supporting members or struts 17 by pivots 18. The strut members 17 are pivotally mounted at fixed pivot points 19 on the frame 11, or on other spaced-apart positions which are fixed with respect to the vehicle. The two strut members 17 and the axle member 16 together with that portion of the vehicle frame between the spaced-apart pivot points 19 form a closed four-sided figure or quadrilateral as shown by dashed lines 21 in FIGS. 3A and 3B. In FIG. 3A, the steerable wheel 15 is in a neutral or "straight ahead" position; and the four-sided figure is symmetrical in the form of an isosceles trapezoid, since the axle member 16 is parallel with the fixed frame part between the pivots 19. In FIG. 3B the vehicle is shown with the strut members 17 pivoted to an extreme position, and it may be noted that the quadrilateral is distorted such that the axle member 16 with the wheel 15 thereon has both turned and translated laterally to an off-center position. Since FIG. 3B is a bottom view looking upwardly, it will be appreciated that the vehicle is making a left turn as indicated by an arrow 22. While the arrow 22 seems to indicate that the vehicle is moving forwardly in a direction such that the steerable wheel 15 is in the front of the vehicle, this invention is equally useful on vehicles wherein the steerable wheel is situated in the rear and the nonsteerable wheels 14 are in the front end. In either event the wheel 15 may steer the vehicle as the strut members are controllably pivoted to simultaneously turn and laterally translate the steerable wheel 15.

As shown in FIGS. 3A and 3B a ground contact point 23 is centered on the bottom of the wheel 15. Obviously, the wheel 15 may have pneumatic tires or the like and will flatten somewhat to present a surface area in contact with the ground; and in this event, the ground contact point 23 will be considered to be a center point of the surface area. The ground contact point 23 is vertically beneath a center point of the axle member 16, and is a midpoint between the pivotal end connections 18 of the strut members 17. As the steerable wheel 15 is turned, the amount of lateral translation may be seen by noting the position of the ground contact point 23 with respect to the vehicle's center line 24. In FIG. 3A, the steerable wheel is in a neutral position with the ground contact point 23 positioned on the vehicle center line 24. In FIG. 3B, the ground contact point 23 is substantially displaced from the vehicle center line as obviously the steerable wheel may be turned either to the right or to the left, and the ground contact point 23 will be correspondingly displaced from the center line 24.

The direction of lateral translation of the steerable wheel 15 is toward the outside of the vehicle's turning circle. Thus when the vehicle turns to the right, as shown by dashed lines in FIG. 1, the vehicle would turn in a circle having a center to the right of the vehicle. The steerable wheel is shifted to the left of the vehicle center line 24, and is therefore shifted further away from the center of the turning circle. This feature will tend to counteract the effect of the centrifugal force which develops during a turn. The centrifugal force will tend to impel the vehicle away from the center of the vehicle's turning circle, and the lateral translation of the wheel 15 outwardly with respect to the turning circle will resist the centrifugal force and will stabilize the vehicle as it turns.

The strut members 17 are bowed outwardly to accommodate for the wheel during a turn. As shown by FIG. 3B and by the dashed lines of FIG. 1, the strut members are formed to extend around the wheel without interference therewith as the wheel is turned to an extreme position. The strut members 17 are rigid such that the pivotal connections 18 of the ends are held at a constant dimension or radius from the pivotal supports 19 to define specific sides of a quadrilateral, even though the actual members bow outwardly. This is best illustrated by FIG. 3B wherein the quadrilateral sides shown by dashed lines are of a discrete length even though the strut member bows outwardly to avoid contact with the wheel.

The strut members 17 constitute opposite sides of the quadrilateral which are equal in length. The other two opposite sides of the quadrilateral are unequal, and comprise the relatively short axle member 16, and a relatively long base side which is the space between the pivot points 19 and which are fixed with respect to the vehicle. As the strut members are controllably pivoted, the relatively short axle with the wheel thereon is turned in accordance with a degree of inequality between the length of the axle member 16 and the spacing between the pivot points 19. If the axle member 16 were equal in length to the distance between the fixed pivots 19, there would be no turning of the axle as the strut member 17 are pivoted. If the axle member 16 were longer than the base length between the points 19, the axle 16 and wheel 15 thereon would turn in the opposite direction to that shown as the strut members are pivoted. Therefore, the relative lengths of the two unequal opposite sides of the quadrilateral—the axle 16 and the base side between the points 19—determine the degree of turning of the steerable wheel 15 as the strut members are pivoted.

It may be noted that the extreme positions of the steerable wheel 15 are likewise determined by the configuration of the quadrilateral structure. As shown in FIG. 3B, the quadrilateral has been distorted to a degree such that the axle member 16 nearly forms a straight line extension of the strut member on the inside of the vehicle turning circle. Since the four-sided figure has become substantially a three-sided figure, any further pivoting of the outside strut member is impossible. If the inside strut member were pivoted further the quadrilateral would be concave in characteristic, and the outside strut member must then pivot inwardly.

As shown in FIG. 2 each strut member 17 is formed of a truss structure and each pivot point 19 includes two bearings 26 and 27 which are spaced apart vertically and which are mounted to pivot on the same vertical axis. By this structure, the axle 16 and wheel 15 are enabled to provide support for much of the weight of the vehicle.

As indicated heretofore, the steering of the wheel 15 is controlled by the pivoting of the strut members 17. FIG. 1 illustrates a means for controllably pivoting the strut members 17. Each strut member includes a rearwardly extending bellcrank arm 31. A pair of tie rods 32 connect between a centrally disposed steering crank member 33 and the bellcrank ends 31 of the strut members 17. The tie rods 32 are connected to the bellcranks 31 by pivot joints 34; and the tie rods connect to the center steering crank by further pivot joints 35. Controlled movement of the central steering crank 33 will be transmitted to both strut members 17 via the tie rods 32 and the bellcrank arms 31. An input movement may be imparted to the central steering crank 33 through a single crank arm 36 or through a steering column at a pivot point 37. The mechanical linkage 31, 32, 33, 36 illustrates one preferred manner of imparting a controlled pivotal movement to the strut member 17. Other means for controllably pivoting the strut members 17 may be devised which will be within the scope of this invention.

An advantage in the four-sided linkage structure including the strut members 17 with the axle 16 extending therebetween may lie in the fact that a single strut member may receive a controlled movement or input to cause that strut member to pivot, since the quadrilateral is a closed figure the movement of one of the strut members will be transmitted to both the axle member 16 and to the other strut member. For example, a steering column could extend to one of the pivot points 19 for causing a first strut member to controllably pivot. This pivotal movement would control the whole quadrilateral assembly, since the axle member 16 would effectively function as a tie rod for transmitting a corresponding movement to the other strut member. The position of a single strut member will determine the configuration of the quadrilateral and the position of the other members thereof. The input movement may drive either or both of the pivotal strut members.

Changes may be made in the form and construction of this vehicle and the steering assembly therefore without departing from the spirit of this invention or sacrificing any of its advantages, and the right is hereby reserved to make all such changes as may fall fairly within the scope of the following claims.

I claim:

1. A steering assembly for a vehicle comprising:
   a pair of strut members swingable only in a horizontal plane that is parallel to the plane containing the chassis of said vehicle pivotally mounted at spaced-apart pivot points;
   an axle member turnable only in a plane parallel to the plane of the vehicle chassis pivotally attached to and extending between the strut members;
   at least one wheel rotatably mounted on the axle member for making a ground contact at a point substantially vertically beneath the center point of said axle; and
   said strut members being operable to controllably pivot with respect to the vehicle to simultaneously angularly turn and laterally translate the axle member and the wheel thereon.

2. A steering assembly for a vehicle in accordance with claim 1 including an input means for controllably pivoting said strut members, said input means comprising:
   a centrally disposed crank means; and
   at least one tie rod connecting between the crank means and a strut member whereby controlled movements of the crank means will be transmitted to controllably pivot the strut member.

3. A steering assembly for a vehicle in accordance with claim 1 wherein said wheel is rotatably mounted on said axle member substantially medially between said pair of strut members.

4. A steering assembly for a vehicle in accordance with claim 3 wherein said strut members have arcuate configurations bowing outwardly with respect to each other to permit said wheel to turn to extreme positions without interfering contact with the strut members.

5. A steering assembly for a vehicle comprising:
   a base structure supporting two pivot points spaced apart from each other;
   two strut members mounted to pivot about said pivot points in a plane which is parallel to the plane containing the chassis of said vehicle;
   an axle member pivotally attached to and extending between the opposite ends of said strut members;
   a wheel rotatably mounted on the axle member for making a ground contact at a point substantially vertically under the center point of said axle;
   said strut members constituting two equal and opposite sides of a quadrilateral wherein the spacing between said pivot points of said base structure constitutes a third side and wherein the axle member constitutes the fourth side;
   said quadrilateral having an isosceles configuration in a neutral position; and
   said strut members being operable to controllably pivot for distorting the quadrilateral from the isosceles configuration wherein the axle member and all portions of the wheel thereon are simultaneously turned and shifted laterally in the same direction.

6. A steering apparatus for a vehicle in accordance with claim 5 wherein the length of said axle member is substantially less than spacing between the pivot points of said base member.

7. A three-wheeled vehicle comprising:
   a pair of wheels mounted to rotate on an axis which is fixed with respect to said vehicle;
   a pair of strut members mounted to pivot only in a plane which is parallel to the plane of the chassis of said vehicle about pivot points which are fixed with respect to said vehicle and which are spaced apart with respect to each other;
   an axle member pivotally attached to and extending between the opposite ends of said strut members;
   a steerable wheel rotatably mounted on said axle member; and said vehicle being steerable by controllably pivoting said strut members about said pivot points to simultaneously turn and laterally translate said axle member and the steerable wheel thereon in such manner that the portions of said wheel lying in a vertical line intersecting said axle are translated in equal amounts.

8. A three-wheeled vehicle comprising:
a pair of wheels mounted to rotate on an axis which is fixed with respect to the vehicle;
a steerable wheel;
a quadrilateral assembly providing the sole support for and control of said steerable wheel, said quadrilateral assembly having four sides mutually connected by pivots including:
  a pair of strut members which are pivotable only parallel to the horizontal plane of the chassis of said vehicle mounted on a respective pair of spaced apart pivot points fixed on the vehicle, said strut members constituting equal and opposite sides of said quadrilateral;
  a spacing between said pair of pivot points constituting a third side;
  an axle member pivotally connected to and extending between said strut members;
said quadrilateral assembly having a symmetrical configuration when said steerable wheel is in a neutral position; and
said quadrilateral assembly being controllably distortable to an asymmetrical configuration for simultaneously turning and laterally translating said steerable wheel in a direction opposite the direction in which the vehicle is being guided, those portions of the wheel lying in a vertical line passing through the axle being translated in substantially equal amounts in said direction.

9. A three-wheeled vehicle in accordance with claim 8 wherein said quadrilateral assembly includes said pair of struts constituting a first pair of opposite sides having equal lengths; and further includes the spacing between said pair of fixed pivot points and said axle member constituting a second pair of opposite sides of unequal lengths, said axle member being substantially shorter than the spacing between said fixed pivot points.